United States Patent [19]
Richmond

[11] Patent Number: 5,816,586
[45] Date of Patent: Oct. 6, 1998

[54] CARRIER FOR A RECYCLING BIN

[76] Inventor: Ronald L. Richmond, 5465 Kennesaw Dr., Baton Rouge, La. 70817

[21] Appl. No.: 754,085

[22] Filed: Mar. 27, 1997

[51] Int. Cl.[6] .......................................................... B62B 1/00
[52] U.S. Cl. .................................. 280/47.34; 280/47.371; 280/47.26
[58] Field of Search .......................... 280/47.17, 47.131, 280/47.18, 47.24, 47.26, 47.315, 47.33, 47.34, 47.321

[56] References Cited

U.S. PATENT DOCUMENTS

| | | | |
|---|---|---|---|
| 2,723,130 | 11/1955 | Andrews | 280/47.33 |
| 4,316,615 | 2/1982 | Willette | 280/47.33 |
| 4,413,834 | 11/1983 | Base | 280/47.33 |
| 4,976,448 | 12/1990 | Wickersham et al. | 280/47.33 |
| 5,445,398 | 8/1995 | Pierce | 280/47.26 |
| 5,562,299 | 10/1996 | Morriessette | 280/47.26 |

*Primary Examiner*—Richard M. Camby
*Attorney, Agent, or Firm*—Warner J. Delaune

[57] ABSTRACT

A carrier for a recycling bin is provided. The carrier will include a frame whose dimensions are chosen to hold the bin within the frame, a handle connected to the frame at one end by a pivotal handle connection, at least two wheels located at the middle of the frame or at the end of the frame opposite the pivotal handle connection, and a frame rest extending downward from the frame at the end where the handle is connected.

3 Claims, 2 Drawing Sheets

CARRIER FOR A RECYCLING BIN

BACKGROUND OF THE INVENTION

1. Field of the Invention

This invention relates, generally, to devices for transporting and holding collection containers, and more particularly, to devices for transporting and holding recycling bins.

2. Prior Art

Recycling programs are in place in many cities throughout the United States. In most programs the residents are given a bin in which they are instructed to place their recyclable materials. The city then has regularly scheduled days on which the recyclable materials are collected from the bins. The residents are typically required to place the bins on the street curb where collection workers can easily remove the materials from the bins.

The exact materials which are recycled can vary from city to city. The materials which are recycled typically include: newspaper, scrap paper, plastic containers, glass containers, and metal containers. When a large quantity of these materials is in the bin, the bin can become quite heavy. This is especially the case for newspaper and glass containers. Newspaper will become even heavier if it gets wet.

The residents will usually keep the bin in or around their house or apartment until the scheduled collection day. To get the bin to the curb residents currently have only a few simple choices. The residents can carry the bins by hand or, if they find the bin to be too heavy, they can try to transport the bins by some other means. Some may place the bin in a wagon or try to use a hand truck. The disadvantage of using a wagon is that one must still lift the bin into the wagon. The disadvantages of a hand truck are that the bottom plate on most hand trucks does not extend far enough to securely hold the bin in place and the bin must therefore be transported at a severe tilt which may allow items to fall out.

Although there are garbage can carriers which are used for transporting garbage cans from one's house to the curb, none of these have been adapted for use with a recycling bin.

What is needed is a carrier which can be used for the easy transportation of a recycling bin. The carrier should make the bin easy to move when full, should not carry the bin at an extreme tilt, and should be adapted so that the user can leave the bin ill the carrier between scheduled pick up days. The carrier should be constructed so that it is easy for the collection workers to place the bin back into the carrier after collecting the items.

The device should also be easy to manufacture.

OBJECTS OF THE INVENTION

It is an object of the present invention to provide a carrier for a recycling bin which will lessen the work required to) transport the bin by hand.

Another object of the present invention is to provide a carrier which will prevent items from falling out of the bin by not carrying the bin at an extreme angle.

Another object of the present invention is to provide a carrier in which the recycling bin can be left between pick up days.

Another object of the present invention is to provide a carrier into which the collection workers may easily replace the bin after emptying items from the bin.

SUMMARY OF THE INVENTION

A device is provided for holding and transporting a recycling bin. The device has a frame, a pivotable handle, wheels, and a fixed front support. The frame includes frame walls which will hold the bin within the frame when the carrier is at rest and when the bin is being moved. The frame also includes a stop which will hold the handle in the vertical position so as to minimize the floor space taken up by the carrier.

An advantage of the invention is that the recycling bin can be left in the carrier between scheduled collection days.

A further advantage of the invention is that the user can move the carrier by simply picking up on the handle and moving the carrier as desired.

A feature of the invention is that it is simple to manufacture and assemble, and consists of only a few parts.

A further feature of the invention is that it can constructed so as to minimize the weight of the carrier.

These and other objects, advantages, and features of this invention will be apparent from the following descriptions of the invention.

DETAILED DESCRIPTION OF THE PREFERRED EMBODIMENTS

Figure 1:
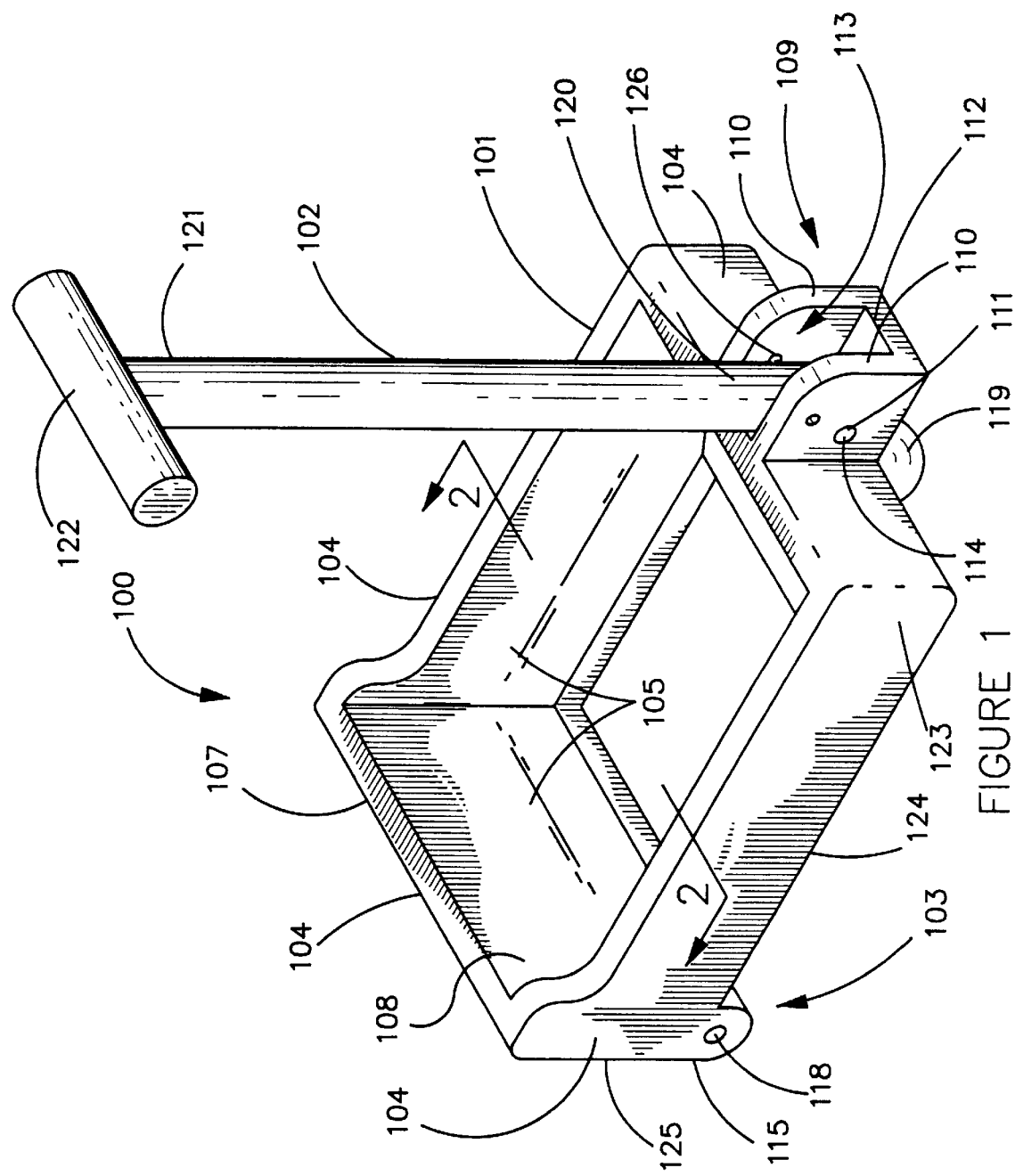
FIG. 1 is a perspective view of a preferred embodiment of the invention.
Figure 2:
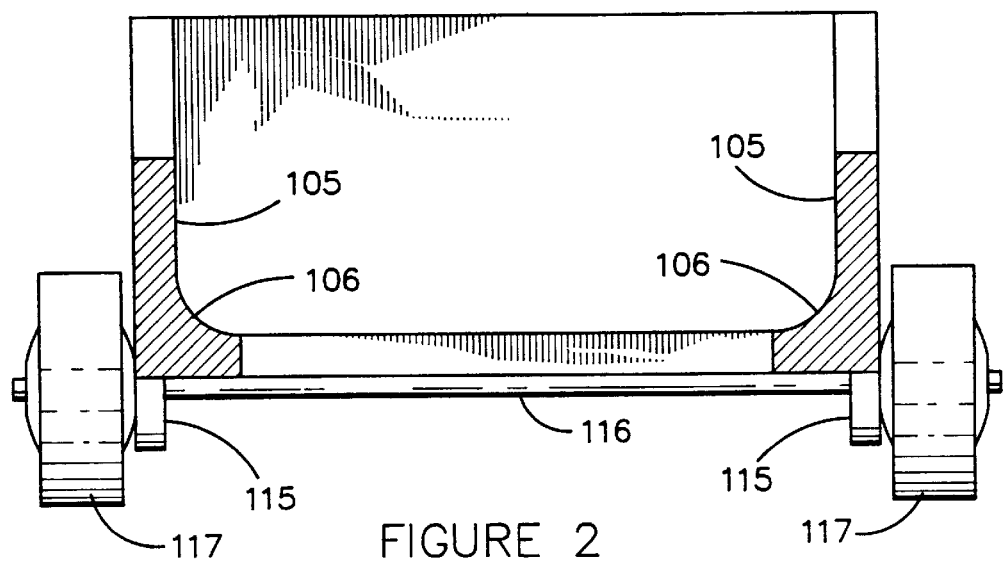
FIG. 2 is a sectional view taken along view lines 2—2 of FIG. 1.
Figure 3:
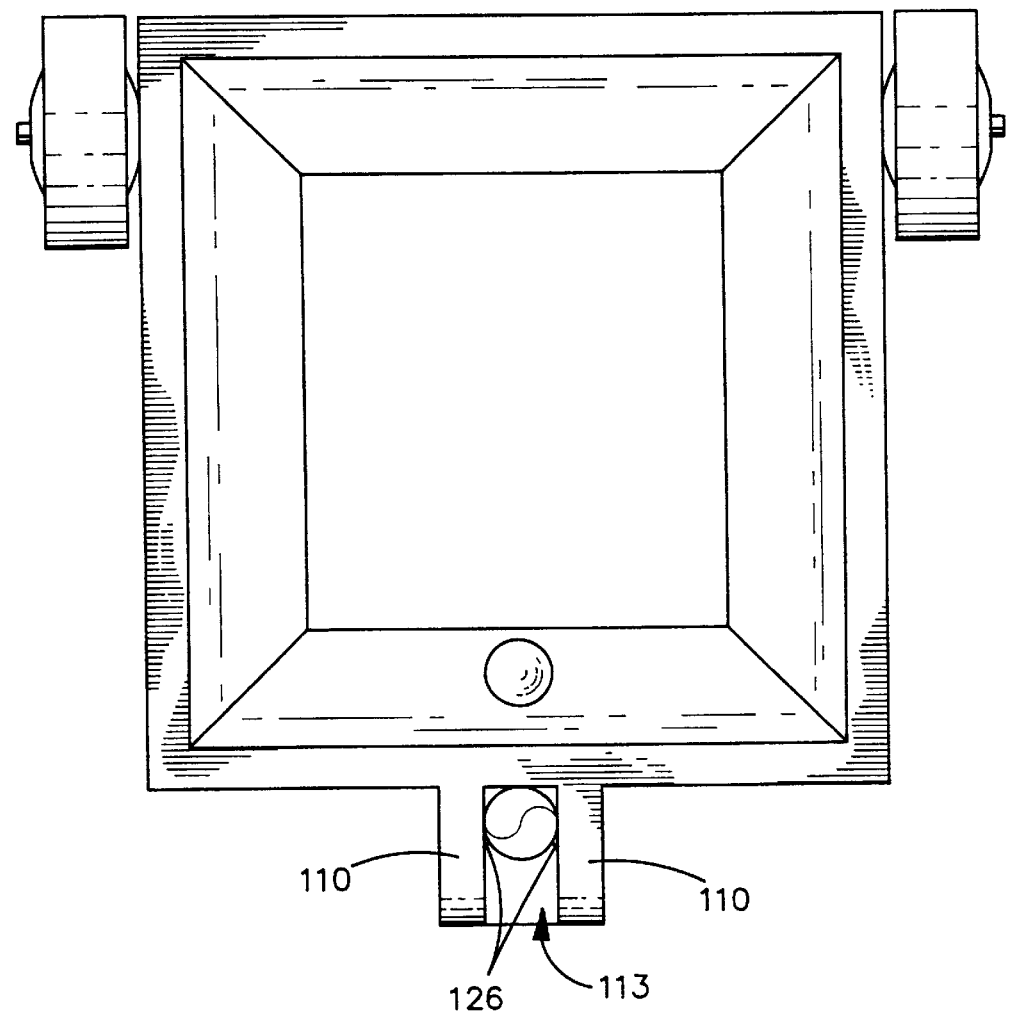
FIG. 3 is a top view of a preferred embodiment of the invention.

Referring to FIG. 1, a preferred embodiment of carrier 100 is depicted. Carrier 100 includes frame 101, handle 102, and wheel assembly 103. Frame 101 includes frame walls 104. Frame 101 will also have front section 123, middle section 124, and rear section 125. Each frame wall 104 includes inner surface 105 which will have curved section 106. Curved section 106 extends inwardly from frame 101 a sufficient distance to hold a standard recycling bin within frame 101.

In a particularly preferred embodiment, frame wall 104 at rear section 125 will include raised portion 108. Raised portion 108 will help to keep the recycling bin (not shown) in place when the user lifts up on handle 102. Handle 102 is connected to frame 101 at front section 123 by handle connecting means 109. In the embodiment depicted handle connecting means 109 includes handle guides 110, pin 111, lower rest 112, and vertical retaining means 113. Handle guides 110 are parallel to one another and are vertically oriented. Each handle guide 110 includes guide aperture 114 through which pin 111 is inserted. Pin 111 will also pass through an aperture (not shown) in handle 102 so that handle 102 may pivot about the axis of pin 111.

One could construct handle connecting means 109 without lower rest 112 and without vertical retaining means 113. In such an embodiment handle 102 would pivot freely through a larger radius of rotation than in the embodiment previously described. Although the embodiment of handle connecting means 109 shown is a pin and aperture configuration, one skilled in the art could use other means such as a conventional hinge connected to frame 101 and handle 102, a pliable connector such as strong rubber strapping, or any other means of pivotably connecting handle 102 to frame 101.

Vertical retaining means 113 keeps handle 102 in the upright position which is desirable when carrier 100 with its accompanying bin is kept in the user's home between collection days. With handle 102 in an upright position, carrier 100 will take up less floor space and the user will not have to bend low to the floor to pick up handle 102. Vertical retaining means 113 is depicted as at least one nib 126 which extends from handle guide 110 into the space between handle guides 100. Preferably each handle guide 110 will have nib 126. Nib 126 is constructed so that handle 102 will remain substantially vertical and not move beyond nib 126 unless the user exerts sufficient force on handle 102. When sufficient force is applied, nib 126 is resilient enough so that it will allow handle 102 to move beyond nib 126.

Although in the embodiment depicted vertical retaining means 113 consists of at least one nib 126, one could use a manual stop such as a pin protruding from a hole in handle guide 110, a clip attached to the middle or upper section of handle 102 which would engage the recycling bin, or any other suitable means or methods for keeping handle 102 in a substantially vertical position.

Carrier 100 will also include wheel assembly 103. In the embodiment depicted wheel assembly 103 is attached to frame 101 at rear section 125, although one skilled in the art could place wheel assembly 103 nearer to or at middle section 124 of frame 101. Wheel assembly 103 consist of axle supports 115, axle 116, wheels 117, and wheel retainers (not shown). Axle supports 115 are attached to frame 101 and extend downward. Each axle support 115 includes axle aperture 118 in which axle 116 is rotatably disposed.

In the embodiment shown axle 116 is a single solid member which extends between both axle supports 115 but one could construct wheel assembly 103 so that each axle support 115 and wheel 117 used its own axle 116. Each wheel 117 is held onto axle 116 by wheel retainers (not shown). Wheel 117 can be either a plastic wheel, a steel and rubber wheel, or any type of wheel conventionally used in lawn equipment and toys.

Frame 101 will also include frame rest 119 which is a rigid or semi-rigid member which extends downward from frame 101 at front section 123. Preferably, the distance which frame rest 119 extends down from frame 101 should be chosen so that carrier 100, and therefore the recycling bin held therein, will be level when carrier 100 is at rest.

Frame 101, frame walls 104, axle supports 115, and frame rest 119 will be constructed of a rigid or semi-rigid material. The thickness of these members will of course vary with the material used in their construction. In a particularly preferred embodiment these members are constructed of plastic as one unitary member and are no more than about ¼ inches thick. Handle guides 110, and handle rest 112 will also be constructed of a rigid or semi-rigid material and will preferably be part of the unitary member.

Nibs 126 will need to be constructed of a semi-rigid material with some resilience. In a particularly preferred embodiment nibs 126 are spherical protrusions from handle guides 110 and are part of a unitary member which is injection-molded. Similarly, in a preferred embodiment frame rest 119 will be a spherical projection extending from front section 123 of frame 101. Spherical projections are used because it is easier to reliably produce them in the plastic injection molding process.

Handle 102 is a elongated rigid or semi-rigid member which has pivot end 120 to which handle connecting means 109 is connected, and user end 121 which is opposite pivot end 120. User end 121 will include grip 122. Although in the embodiment depicted grip 122 is a rod or tube which is perpendicular to the rest of handle 102, grip 122 could be a soft rubber or plastic section covering over user end 121, a rope loop or solid loop at user end 121, or any other conventional means which would allow the user to grab user end 121. Alternatively, one could eliminate grip 122 entirely, and the user could just grab handle 102 at user end 121.

In the embodiment depicted handle 102 and grip 122 are constructed of plastic as one unitary member although one could construct handle 102 and grip 122 of any suitable rigid or semi-rigid material. The length of handle 102 is chosen so that when an adult user of average height holds grip 122 in the user's hand while standing erect, frame rest 119 will be lifted off the ground and carrier 100 will roll along on wheel assembly 103.

Applicant is not aware of any standard dimensions for recycling bins. However, one major company which has contracts to handle recycling operations for several municipalities uses an 18 gallon bin which will fit in the embodiment depicted. Although in the embodiment depicted carrier 100 is constructed to correspond to fit this 18 gallon bin, one skilled in the art could also construct carrier 100 so as to fit to recycling bins of varying dimensions.

Without limitation, and only to aid those skilled in the art to practice the invention, some of the dimensions of the embodiment depicted will be given. The distance between inner surfaces 105 of opposing frame walls 104 is approximately 14.5 inches for inner surfaces 105 which are parallel to axle 116 and approximately 21.5 inches for inner surfaces 105 which are perpendicular to axle 116. The distance between the edges of the opposing curved sections 106 is approximately 11 inches for inner surfaces 105 which are parallel to axle 116 and approximately 18 inches for inner surfaces 105 which are perpendicular to axle 116. Handle 102 is approximately 20 inches in length, and when handle 102 is in the vertical position and carrier 100 is at rest, grip 122 will be approximately 25 inches from the ground.

Although the carrier described herein is for a single recycling bin, it will obvious to those skilled in the art to adapt the embodiment described herein to hold two or more bins. The bin could be placed adjacent to one another, either end to end or side by side, and frame 101 would be adapted to carry the multiple bins. Alternatively, one could adapt frame 101 to hold the bins vertically.

There are of course other alternate embodiments which are obvious from the foregoing descriptions of the invention, which are intended to be included within the scope of the invention, as defined by the following claims.

I claim:

1. A carrier for a recycling bin or other similar container comprising:

(1) a frame having a middle section, a front section and a rear section, wherein said frame comprises four adjoining frame walls, each said frame wall having an inner surface, said inner surface having a curved section extending inwardly from said frame a sufficient distance so as to hold a recycling bin within said frame walls, and wherein said frame wall in said rear section includes a raised portion;

(2) a handle having a pivot end and a user end, said handled being connected at said pivot and to said front section of said frame by handle connecting means, said handled connecting means further comprising vertical retaining means for keeping said handle in an upright position, wherein said handle connecting means further comprises two vertically oriented, parallel handle guides, and wherein said vertical retaining means comprises at least one resilient nib extending from one said handle guide into the space between said handle guides, said nib being adapted such that said handled will remain substantially vertical and not move beyond said nib unless a user exerts sufficient force on said handle;

(3) a wheel assembly connected to said frame; and (4) a frame rest extending downward from said front section of said frame.

2. The carrier in claim 1, wherein said handle further comprises a grip at said user end.

3. The carrier in claim 2, wherein the length of said handle is adapted such that when an adult user of average height lifts on said grip, said frame rest will be lifted off the ground and said carrier can be rolled along on said wheel assembly.

* * * * *